United States Patent [19]

Koppl

[11] 4,019,541
[45] Apr. 26, 1977

[54] REMOVABLE PLUG FOR PIPE JUNCTION, AND METHOD AND APPARATUS FOR INSTALLING

[76] Inventor: Leo T. Koppl, 1432 S. Birch, Montebello, Calif. 90640

[22] Filed: Sept. 8, 1975

[21] Appl. No.: 611,124

[52] U.S. Cl. .................................. 139/94; 138/89
[51] Int. Cl.² .................................... F16L 55/10
[58] Field of Search ............. 138/89, 94; 220/233, 220/235, 298, 328, 327

[56] References Cited

UNITED STATES PATENTS

| 502,635 | 8/1893 | Rettig | 220/327 |
|---|---|---|---|
| 1,758,909 | 5/1930 | Coffin | 220/298 X |
| 2,085,119 | 6/1937 | Penick et al. | 138/94 |
| 2,285,779 | 6/1942 | Mueller et al. | 138/94 |
| 2,425,483 | 8/1947 | Mueller et al. | 138/94 X |
| 2,465,727 | 3/1949 | Jensen | 138/89 |
| 2,566,816 | 9/1951 | Work | 220/235 X |
| 2,696,966 | 12/1954 | Mueller et al. | 138/94 X |
| 2,942,754 | 6/1960 | Young et al. | 220/298 |
| 3,070,129 | 12/1962 | Poulallion et al. | 138/89 |
| 3,278,071 | 10/1966 | Pangburn | 220/328 |
| 3,463,195 | 8/1969 | Cooke | 138/94 |
| 3,534,941 | 10/1970 | Dunton | 138/89 X |
| R24,543 | 9/1958 | Bilderback | 220/298 |

*Primary Examiner*—Richard E. Aegerter
*Assistant Examiner*—James E. Bryant, III
*Attorney, Agent, or Firm*—Harris, Kern, Wallen & Tinsley

[57] ABSTRACT

A conical plug adapted to be seated on a conical seat in a pipe and locked in seated position, and an apparatus for seating and locking, or unlocking and unseating, the plug, and a method of doing so.

9 Claims, 7 Drawing Figures

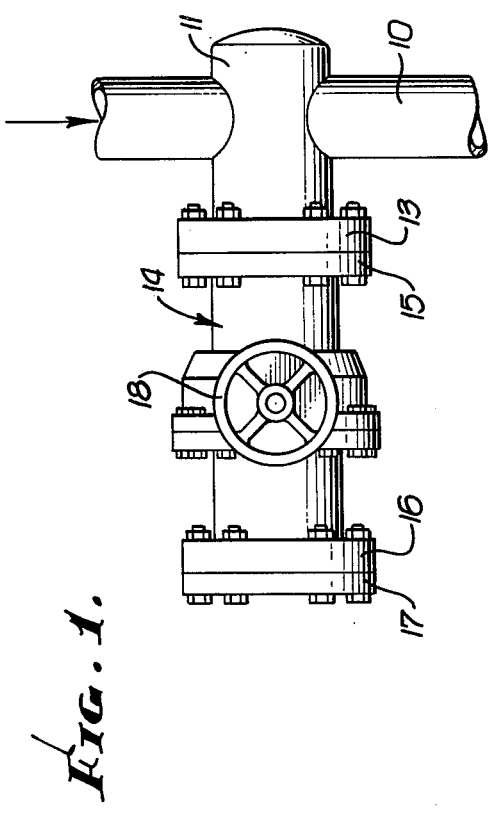
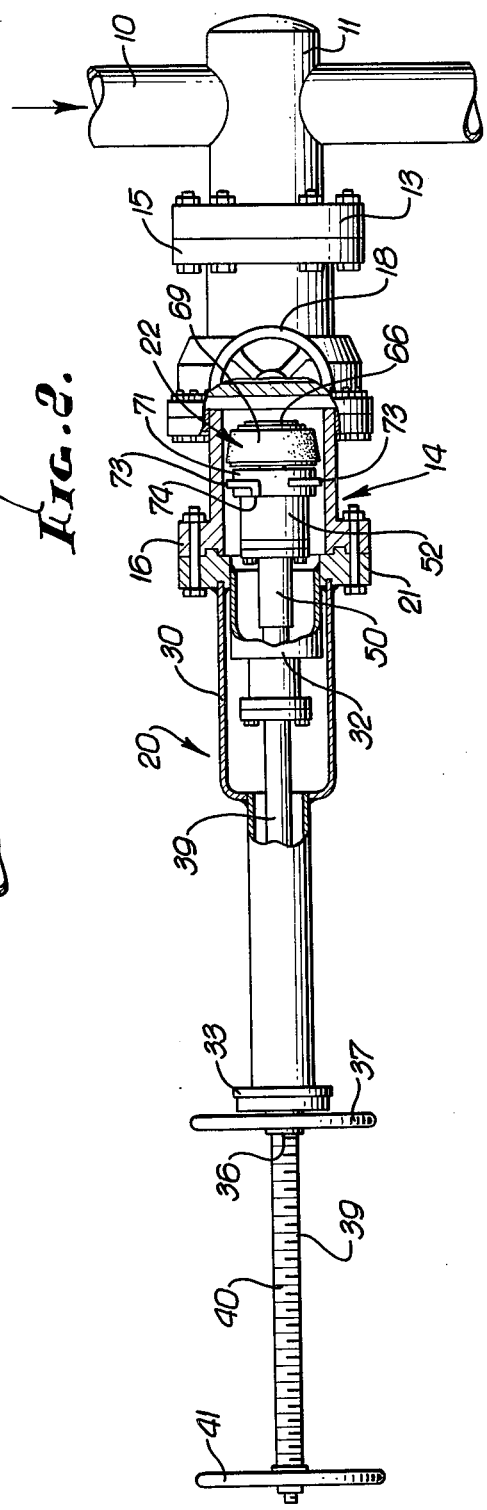
Fig. 1.
Fig. 2.

REMOVABLE PLUG FOR PIPE JUNCTION, AND METHOD AND APPARATUS FOR INSTALLING

BACKGROUND OF INVENTION

In pipeline systems, to repair a break or leak in a section of the system, or to extend the system by a branch pipeline, it is common practice to secure a T-fitting to the pipe to be repaired or extended by a branch line. The T-fitting having a seat therein in or upon which a plug can be seated to prevent fluid flow through the fitting from the mainline pipe without interrupting flow through the latter. Conversely, it may be desirable to remove the plug from the T-fitting without interrupting flow through the mainline pipe.

Since such systems frequently carry a flow of fluid, such as oil, under high pressure, complicated apparatus is normally required to seal off the T-fitting while the plug is installed or removed to prevent loss of fluid from the system. Such apparatus frequently includes a gate valve, or the equivalent valve, for opening or closing fluid flow through the fitting while the plug is installed or removed by the apparatus. Since such valves are expensive, it is usual practice to remove the valve after a fitting has been plugged to release the valve for service elsewhere, and then to simply cap the fitting with a blind cap.

Such pipeline systems and the repair and extension thereof, T-fittings used therein, gate valves used therein, plugs for plugging the fittings, and apparatus for seating and unseating the plugs in the fittings, are illustrated and described in the brochures of T. D. Williamson, Inc., of Tulsa, Okla., and the patents listed therein, as follows: No. 501.0 (Apr. 15, 1970); No. 502.0 (Apr. 15, 1970); No. 502.1 (Jan. 15, 1968); No. 503.0 (Jan. 1, 1965); No. 504.0 (Mar. 1, 1969); and No. 505.0 (Mar. 1, 1969).

Many of such pipeline systems in commercial use are employed to carry a fluid, such as oil or refinery liquids, not only at relatively high pressure, e.g., 1000 p.s.i., but at high temperatures of the liquid, e.g. 500° – 700° F. None of the conventional methods or equipment of which I am aware for plugging a T-fitting or branch line in such a pipeline system without interrupting flow in the system are capable of satisfactory operation is such a high-pressure, high-temperature system, and it is a primary object of this invention to provide a T-fitting, a plug therefor, and apparatus for installing and removing the plug without interrupting flow in the system, which can be satisfactorily used in such a high-pressure, high-temperature system.

THE PRESENT INVENTION — GENERALLY

The present invention includes a specially designed T-fitting for a pipeline system, having a novel seat for a plug and means cooperating with the plug for locking the plug on the seat.

The invention also includes a novel plug which can be moved axially from a remote location to seat the plug on a seat, which can be rotated from a remote location to lock the plug on the seat or to unlock the plug from the seat, with means for maintaining seating pressure on the plug to prevent fluid leakage between the plug and its seat.

Also included in the invention is an apparatus for moving such a plug longitudinally onto or off of such a seat, rotating the plug into or out of locking relation with the seat, all while preventing any substantial loss of fluid from the system to which the fitting is attached.

The invention, as described above, can be used satisfactorily with a high-pressure, high-temperature pipeline system and the plug may be left seated indefinitely without deterioration or loss of fluid from the system but can be removed from the seat without difficulty at any time.

All of the foregoing features of the invention are objects of the invention.

THE DRAWINGS

In the drawings, which are for the purpose of illustration only:

FIG. 1 is a plan view of a conventional gate valve installed in a branch line from a main pipe line;

FIG. 2 is a plan view, partially in section, showing the apparatus of the present invention connected to the outer end of the gate valve of FIG. 1;

Figure 3:
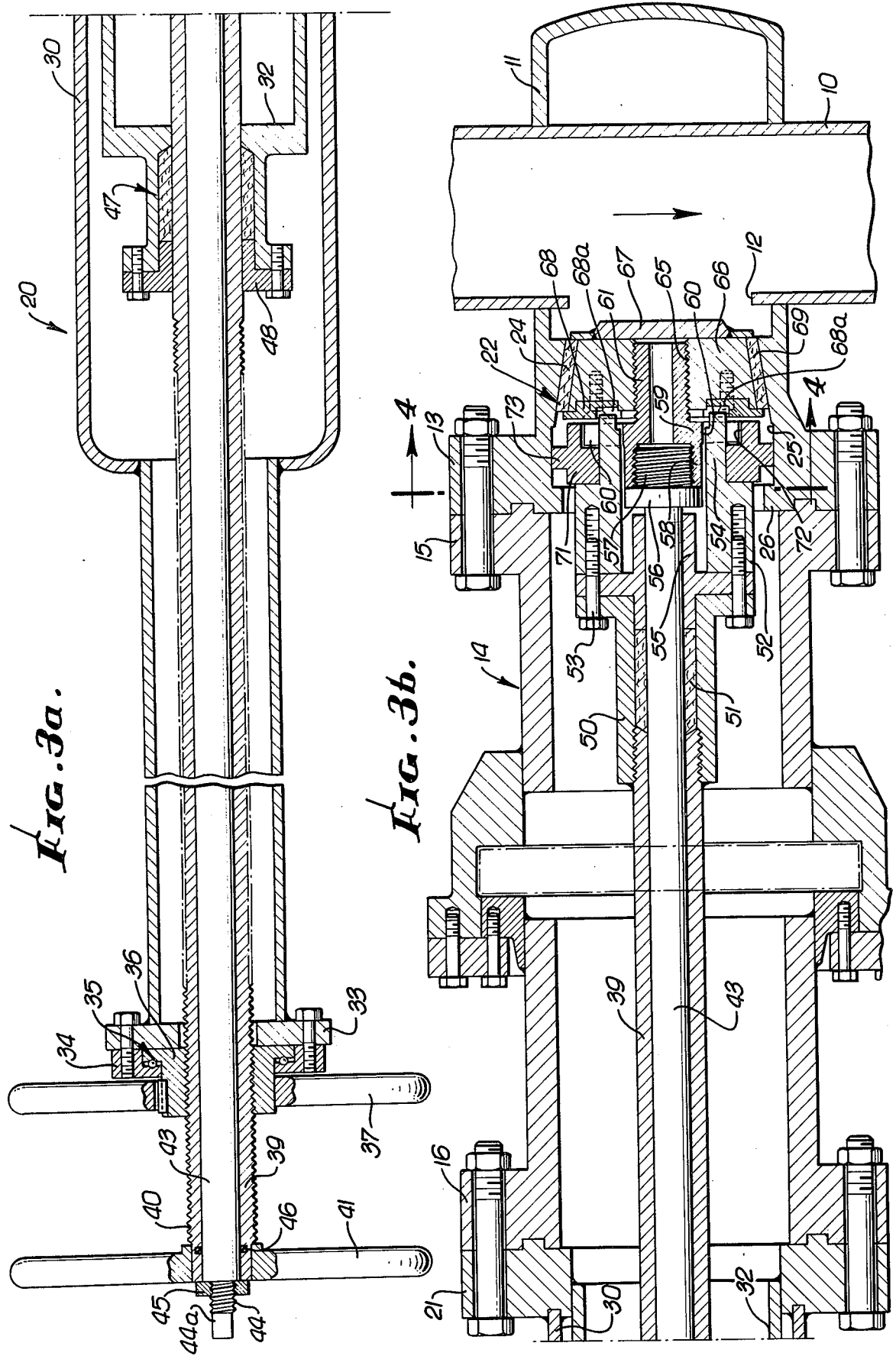
Figure 4:
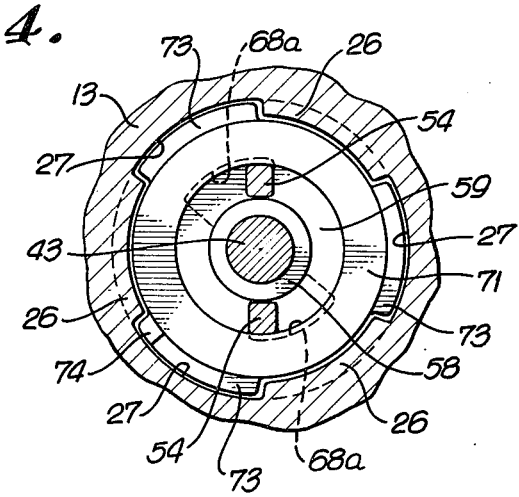
Figure 5:
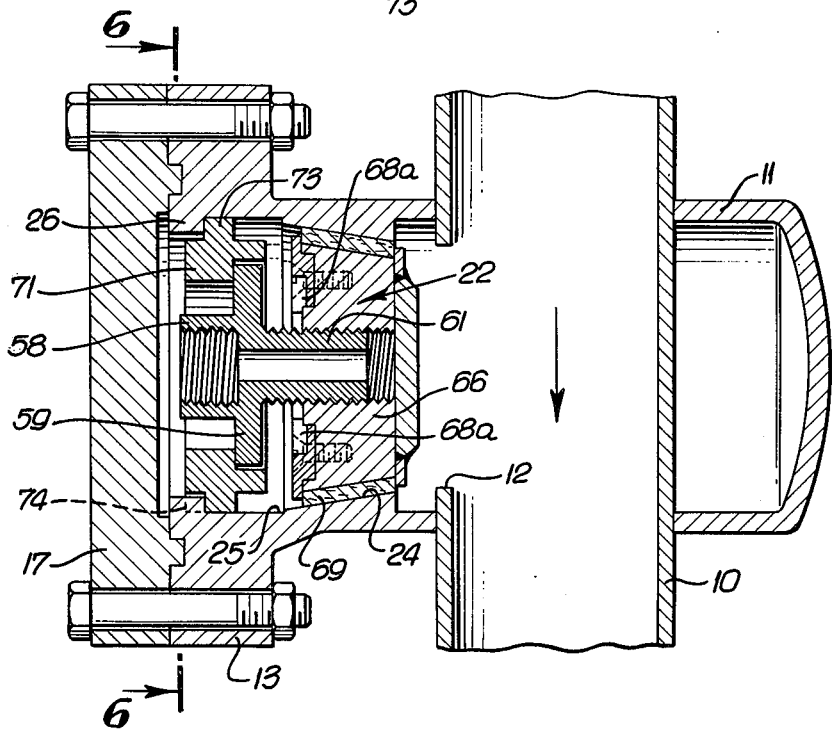
Figure 6:
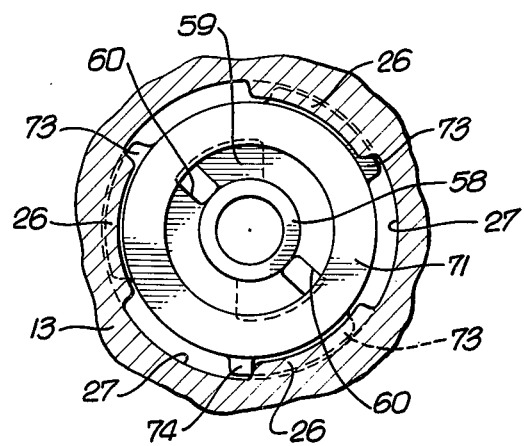

FIGS. 3a and 3b together form a longitudinal sectional view of the apparatus of the present invention in such a branch line;

FIG. 4 is a cross-sectional view taken on the line 4—4 of FIG. 3b illustrating some of the parts of the apparatus in one position;

FIG. 5 is a sectional view similar to a portion of FIG. 3b, showing the plug of the invention seated and locked in the branch line; and FIG. 6 is a cross-sectional view taken on the line 6—6 of FIG. 5.

DETAILED DISCLOSURE OF INVENTION

Referring to FIG. 1 of the drawings there is shown a short section of a main pipe line 10 having a short branch pipe 11 secured thereto and communicating therewith through a hole 12 in the main pipe line (see FIG. 3b), the outer end of the branch pipe having a flange 13 to which is bolted a gate valve 14 having flanges 15 and 16, there being a circular cap plate 17 bolted to the flange 16 to close the outer end of the gate valve. The gate valve 14, which is conventional, may be operated by means of a hand wheel 18 to open or close communication through the gate valve and the branch pipe 11 with the main pipe line 10. As described so far, the elements of FIG. 1 are all conventional elements long in public use.

Referring to FIG. 2 of the drawings, the cap plate 17 of FIG. 1 has been removed and substituted therefor is an installation mechanism 20 having a flange 21 bolted to the flange 16 of the gate valve 14. Carried on the inner end of the installation mechanism 20 is a plug means 22.

As shown in FIG. 3b, the outer end of the branch pipe 11 and its flange 13 are provided with a conical seat 24 and with an internal annular groove 25 of greater diameter than the maximum diameter of the seat 24, forming a broken ledge comprised of semicircular segments 26, preferable three in number, which are separated by semicircular slots 27, as best shown in FIGS. 4 and 6.

The installation mechanism 20 includes an outer tubular barrel 30 connected to the flange 21 and having therein an inner tubular barrel 32 also connected to the flange 21. The other end of the outer barrel 30 is provided with an annular flange 33 to which is rigidly secured an outer race 34 of an annular ball bearing 35, the inner race 36 being internally threaded and carrying a hand wheel 37, rigidly secured to the inner race.

Extending through the outer barrel 30 is a tubular member 39 having external threads 40 along a portion of its length which threadedly engage the threads in the inner race 36 so that when the hand wheel 37 and its attached inner race 36 is rotated the tubular member 39 is advanced into or retracted from the tubular barrel 30. Suitably keyed to the outer end of the tubular member 39 is a second hand wheel 41, as by suitable keying or otherwise so that upon rotation of the second hand wheel the outer tubular member is rotated.

Extending longitudinally through the outer tubular member 39 is a cylindrical rod 43 the outer end of which is threaded at 44 to receive a nut 45 by which the outer tubular member 39 and the rod may be rigidly connected together. The extreme outer end of the rod 43, beyond the threads 44, is reduced at 44a to a square or hexagon cross-sectional shape to receive a conventional hand wrench by which the rod may be rotated as described hereinafter. Adjacent the outer ends of the tubular member 39 and the rod 43 is an annular O-ring seal 46, sealing against longitudinal fluid leakage between the tubular member and the rod. Carried on the end of the inner barrel 32 is a stuffing box 47 having an annular bearing 48 secured thereto which forms one end of the stuffing box and journals the tubular member 39, the stuffing box providing a fluid seal to prevent leakage from the interior of the inner barrel 32 outwardly along the tubular member 39. The bearing 48 also serves to assist in supporting the tubular member 39 and rod 43 therein. The stuffing box 47 and its packing serve to prevent fluid leakage along the tubular member 39 from the cavity within the inner barrel 32.

On the inner end of the tubular member 39 is provided a stuffing box 50 having annular packing 51 therein to prevent fluid leakage between the rod 43 and the tubular member 39. To the stuffing box 50 is secured a cylindrical actuating member 52, as by screws 53, having a pair of circumferentially spaced pins 54, best shown in FIGS. 3b and 4. On the stuffing box 50 is a short spacer tube 55 which extends into the actuating member 52, for a purpose to be described herinafter.

The inner end of the rod 43 is provided with a flange 56 and an externally threaded boss 57. The boss 57 is threaded into an internally threaded boss 58 of a circular plate member 59 having diametrically spaced rectangular notches 60 therein and having extending therefrom an externally threaded tubular member 61.

The tubular member 61 is threaded into the threaded internal bore 65 of an annular plug member 66. The plug member 66 is provided with a circular end plate 67, secured, as by welding, to the plug member and an annular plate 68 removably secured to the plug member, as by suitable screws. The plates 67 and 68 secure on the exterior of the plug member 66 an annular packing element 69. The exterior of the plug member 66 and the packing element 69 are in the form of a truncated cone adapted to seat in fluid-tight relation on the conical seat 24 of the flange 13.

Intermediate between the plug means 22 and the cylindrical actuating member 52 is an annular locking collar 71 provided with a counterbore 72 which fits down over the circular plate member 59. The locking collar 71 is provided with circumferentially spaced, outwardly extending segments 73, preferably three in number, as best shown in FIGS, 3b and 4.

When assembled as shown in FIG. 3b, the pins 54 of the actuating member 52 extend through the annular locking collar 71 and through the notches 60 of the circular plate member 59.

The annular plate 68 of the plug member 66 is provided with a pair of semicircular notches 68a, diametrically disposed relative to each other, each of which is slightly longer than a corresponding notch 60 in the circular plate member 59, each of the notches 68a receiving the end of one of the pins 54, and limiting rotational movement of the actuating member 52 relative to the plug member 66 when the parts are assembled as shown in FIG. 3b.

For installation of the plug means 22 in the flange 13 of the equipment shown in FIG. 1, the plug means 22 and the installation mechanism 20 are first assembled, generally as shown in their respective relations in FIG. 2 apart from the equipment shown in FIG. 1. The cap plate 17, shown in FIG. 1, is then removed from the flange 16 and the flange 21 of the installation mechanism 20 is than bolted thereto, shown in FIG. 2. At this point in the installation procedure, the inner barrel 32 of the installation mechanism 20 communicates with the interior of the gate valve 14. The gate valve 14 is then opened by rotating the hand wheel 18 to move the gate (not shown) of the gate valve out of axial alignment with the plug means 22 carried by the installation mechanism 20, permitting a small amount of fluid to flow from the main pipe line 10 through the branch pipe 11 and the gate valve 14 into the inner barrel 32 of the installation mechanism. Such small quantity of fluid is the only fluid lost from the system in the plug installation practice of my invention. The registration of the pins 54 is the notches 68a initially limits to a small extent any rotation of the plug means 22 relative to the actuating member 52 and prevents the plug means from unscrewing from tubular member 61, due to the circulation of fluid from the main pipe line 10 around the plug means or otherwise during installation of the plug means in the branch pipe 11, and this is a desirable feature of the invention.

In the initial assembly position shown in FIG. 2 the nut 45 on the end of the rod 43 is threaded tightly against the end of the tubular member 39 to clamp the rod and tubular member together as a unit. The hand wheel 37 is then rotated in a clockwise direction, which moves the tubular member 39, rod 43, and associated parts to the right, as seen in FIG. 2. The friction against the tubular member 39 provided by the stuffing box 47 will normally prevent the tubular member from rotating during such longitudinal movement. However, if such friction is insufficient to prevent such rotation the hand wheel 41 is held by the operator to prevent such rotation.

Such longitudinal movement of the tubular member 39 and associated parts is continued until some part of the plug means 22 strikes something and further longitudinal movement is halted. This occurs by reason of the segments 73 of the annular locking collar 71 striking the segments 26 of the flange 13, or, if the segments 71 have passed cleanly through the slots 27 of the locking collar, by the plug means 22 seating on the conical seat 24 of the flange 13. The operator can tell which is the case by noting from the remaining exposed threads 40 on the tubular member 39 the extent of longitudinal movement of the tubular member up to the point at which such longitudinal movement is halted. If such extent of movement indicates that the segments 73 have hit the segments 26, the operator then rotates the hand wheel 37 counterclockwise through a small degree of arc to back the plug means 22 off of the point of contact, and the hand wheel 41 is then rotated through a small degree of arc to rotate the plug means, and the hand wheel 37 is then again rotated clockwise to again advance the plug means towards the seat 24. If by such alignment operation the segments 73 on the collar 71 have been aligned with the slots 27 in the flange 13 they will pass therethrough and rotation of the hand wheel 37 and longitudinal movement of the plug means are continued until the plug means seats on the seat 24. If the segments 73 again hit the segments 26 the alignment operation is repeated until the segments 73 are aligned with the slots 27 and the plug means 22 can be seated on the seat 24.

As soon as the plug means 22 seats on the seat 24 the hand wheel is rotated counterclockwise through a small degree of arc to back the plug means slightly off of the seat 24 to eliminate friction therebetween.

The next step is to rotate the hand wheel 41 clockwise to rotate the tubular member 39, rod 43, and associated parts. This rotates the annular locking collar 71, moving its segments 73 under the segments 26 of the flange 21, from the position shown in FIG. 4 to that shown in FIG. 6 and until the ear 74 on one of the segments 73 engages the end of its slot 27, as shown in FIG. 6, which stops further such rotation of the locking collar.

The nut 45 is then loosened to permit rotation of the rod 43 relative to the tubular member 39, and the rod is then rotated in a counter direction while the tubular member 39 is held against rotation. The pins 54 also hold the plate member 59 and plug member 66 against rotating so the rotation of the threaded boss 57 of the rod 43 in the internally threaded boss 58 moves the plate member and plug member forward until the plug member seats on the seat 24 with the annular packing 69 tightly engaging the seat 24.

The nut 45 is then loosened, then the hand wheel 41 is rotated counterclockwise to similarly rotate the rod 43, the actuating member 52 and the plate member 59. Since the plug member 66 is held against rotation by the frictional engagement of its packing 69 with the seat 24, such rotation of the plate member 59 unscrews its threaded tubular member 61 from the threaded bore 65 of the plug member 66 and the lefthand movement of the plate member 59, as seen in FIG. 3b, from its position shown in FIG. 3b to its position shown in FIG. 5, similarly moves the locking collar 71 to the left until the left faces of its segments 73 engage the right faces of the segments 26 of the flange 21, thus separating the locking collar and plug member 66 to firmly seat th lug member on the seat 24 in fluid tight engagement therewith.

The nut 45 is then loosened and the rod 43 is rotated to unscrew its boss 57 completely from the boss 58 of the plate member. The nut 45 is then tightened to again clamp the rod 43 and tubular member 39 together, and the hand wheel 37 is rotated to move the tubular member, rod, and actuating member 52 longitudinally to the left out of the branch pipe 11. The flange 15 is then unbolted from the flange 13, which completely disengages the installation mechanism 20 from the branch pipe 11. The cap plate 17 is then bolted to the flange 13, as shown in FIG. 5, and the installation of the plug member 66 on the seat 24 and in a fluid seal relation therewith is then complete.

To remove the plug member 66 from the branch pipe 11, the installation procedure described above is reversed.

Although a preferred embodiment of the invention has been described it is to be understood that modifications may be made therein without departing from the spirit of the invention, and I do not intend to be limited to such preferred embodiment but desire to be afforded the full scope of the following claims.

I claim:

1. In a device for plugging a pipe having a frusto-conical seat therein, the combination of:
   a frusto-conical plug member adapted to seat on the pipe seat in fluid-tight relation therewith;
   a generally circular plate member axially aligned with said plug member and threaded thereinto and axially movable relative thereto in one direction; and
   an annular locking collar axially aligned with said plate member and carried thereby and axially movable thereby in said direction, adapted to engage and cooperate with the pipe when said collar is moved in said direction to lock the plate member and plug member against axial movement away from the seat of the pipe.

2. A device as defined in claim 1, including installation means detachably connected to said plug means, said installation means including
   axial movement means for moving said plug means axially into the pipe and into seating relation with the pipe seat from a position exterior of the pipe, and
   rotational means for rotating said locking collar relative to the pipe while therein.

3. A device as defined in claim 2, in which said installation means is adapted to be detachably connected to the pipe in axial alignment therewith.

4. A device as defined in claim 1, including:
   rod means having a threaded end adapted to thread into said plate member;
   a tubular member concentric with said rod means and journalling the same,
      said tubular member having pin means on an end thereof and extending longitudinally through said locking collar and said plate member to prevent rotation of said tubular member relative to said plate member;
   means for moving said tubular member, said rod means, and said plug member longitudinally relative to the pipe seat; and
   means for rotating said tubular member, said rod means, and said plate member.

5. A device as defined in claim 1, including:
   a tubular barrel adapted to be detachably connected to the pipe and in axial alignment therewith;
   a tubular member within and concentric with said tubular barrel;
   an actuating member rigidly connected to one end of said tubular member, having
      pins means extending longitudinally through said locking collar and said plate member;
   rod means within and extending longitudinally through said tubular member having one end detachably threaded into said plate member;
   means for clamping said tubular member and said rod means together, but releasable to permit relative rotation therebetween;

means carried by said tubular barrel and adapted to move said tubular member longitudinally in both directions in said tubular barrel; and means carried by said tubular member for rotating it relative to said tubular barrel.

6. A device as defined by claim 5, in which said tubular member, said rod means, said actuating member, said locking collar, said plate member, and said plug member may be clamped together to permit rotation of the same as a unit relative to said tubular barrel to rotate said locking collar relative to the pipe, but releasable to permit said rod means to be rotated relatvie to said tubular member to partially unscrew said plate member from said plug member to longitudinally separate said locking collar and said plug member and to unscrew said rod means from said plate member to permit said tubular member, said rod means, and said actuating member to be detached from said locking collar, said plate member, and said plug member to leave the latter in the pipe in fluid sealing relation therewith.

7. In a pipe plugging device, the combination of:
a pipe having a frusto-conical pipe seat therein, and having a fixed semicircular locking ledge axially aligned with and longitudinally spaced from said seat;

plug means adapted to be seated on said pipe seat in fluid-tight relation therewith, said plug means including
a frusto-conical plug member adapted to seat on the pipe seat in fluid-tight relation therewith,
locking collar means movable away from said plug member and adapted to cooperate with said locking ledge to lock said plug means on said pipe seat and against longitudinal movement relative thereto when so moved,
in which said plug means includes a generally circular plate member between said locking collar and said plug member, said plate member being axially aligned with said plug member and threaded thereinto and carrying said locking collar.

8. A device as defined in claim 7, including installation means detachably connected to said plug means, said installation means including
axial movement means for moving said plug means axially into said pipe and into seating relation with said pipe seat from a position exterior of said pipe, and
rotational means for rotating said plug means relative to said pipe while therein.

9. A device as defined in claim 8, in which said installation means is adapted to be detachably connected to said pipe in axial alignment therewith.

* * * * *